United States Patent [19]

Malmon

[11] 3,869,083

[45] Mar. 4, 1975

[54] METHODS AND APPARATUS FOR DETERMINING THE NUMBER OF OBJECTS IN AN ASSEMBLAGE

[76] Inventor: Arthur G. Malmon, P.O. Box 30211, Bethesda, Md. 20034

[22] Filed: July 24, 1972

[21] Appl. No.: 274,253

Related U.S. Application Data

[63] Continuation-in-part of Ser. No. 844,264, July 24, 1969, abandoned.

[52] U.S. Cl. ........ 235/92 PC, 235/92 SH, 235/92 R, 250/222 PC
[51] Int. Cl. .......................................... G06m 11/02
[58] Field of Search ....... 235/92 PC, 92 EV, 92 PL, 235/92 PK, 92 SH; 340/146.3 Y, 146.3 AC; 324/71 CP; 250/222 PC; 356/102

[56] References Cited
UNITED STATES PATENTS 3,178,688  4/1965  Hill et al. .................. 340/146.3 AC
3,626,164  12/1971  Pontigny et al. ................. 235/92 PC Primary Examiner—Gareth D. Shaw
Assistant Examiner—Joseph M. Thesz, Jr.
Attorney, Agent, or Firm—Robert H. Epstein

[57] ABSTRACT

Methods and apparatus for determining the number of objects in an assemblage utilizing a position-independent mode of operation wherein the assemblage is scanned line-by-line, a pulse is generated for each object encountered during each scan line, the number of pulses generated during successive scan lines are compared to generate difference pulses corresponding to the difference in number of objects in successive scan lines, and the difference pulses are totalled to represent the number of objects in the assemblage. Various modifications of the methods and apparatus utilize counter and register circuits for storing and comparing the number of pulses generated during scan lines, and a circuit is provided to automatically compensate for edge overlap.

27 Claims, 18 Drawing Figures

EDGE OVERLAP

N° OF OBJECTS MISSED (log.)

N° OF OBJECTS IN AREA

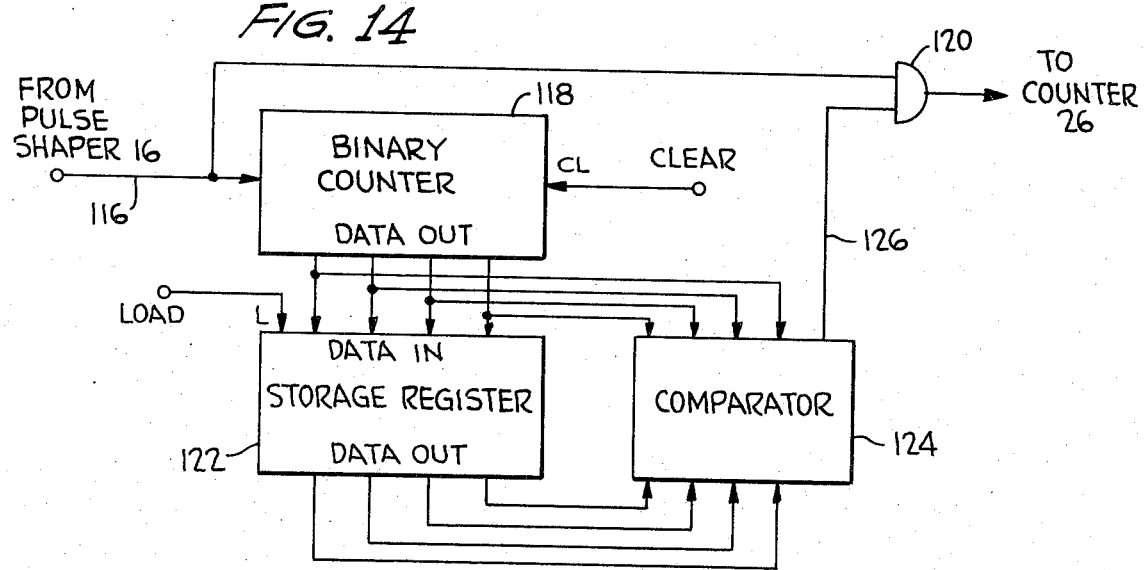
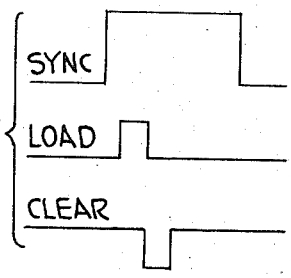
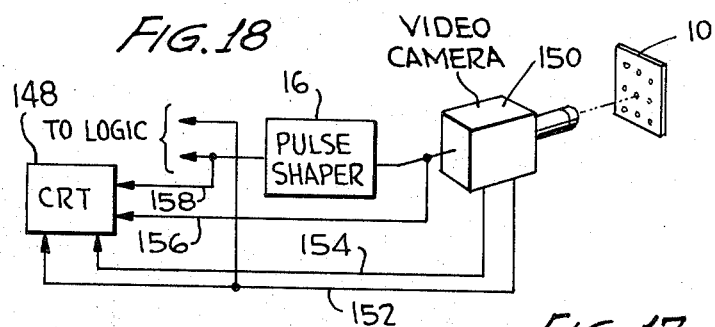
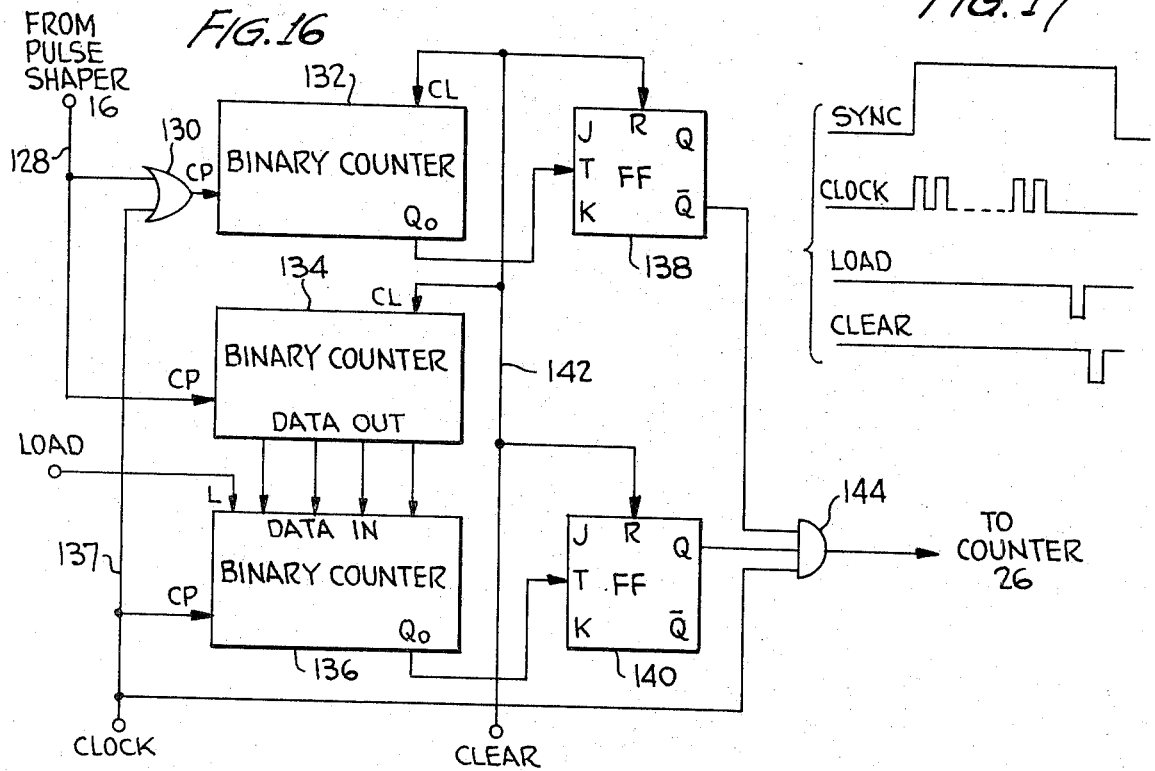

METHODS AND APPARATUS FOR DETERMINING THE NUMBER OF OBJECTS IN AN ASSEMBLAGE

This application is a continuation-in-part of patent application Ser. No. 844,264 filed July 24, 1969, now abandoned.

BACKGROUND OF THE INVENTION

1. Field of the Invention

The present invention pertains to methods and apparatus for determining the number of discrete objects in an assemblage and, more particularly, to such methods and apparatus for use in biomedical fields.

2. Discussion of the Prior Art

In biomedical fields it is frequently desired to determine the number of various, randomly distributed objects, such as bacterial colonies, virus plaques, blood cells, etc. In the case of bacterial colonies, for instance, it is common practice for the number of colonies to be determined by an individual who must visually identify and tally each colony on a plate, where the number of colonies may be on the order of hundreds. Although a human operator can, usually, discriminate between colonies and artifacts, and identify overlapping colonies, the operation is time-consuming, and the natural human tendency to boredom and fatique inevitably leads to reduced efficiency in terms of time and error when many such plates must be counted. The plaque assay method for measurement of viral activity is generally acknowledged to be the most accurate available, but because of the time and expense involved in manually counting the plaques, it is seldom used in large scale operations.

Apparatus have been proposed for automatically counting biomedical and similar objects by scanning the area containing the objects on a line-by-line basis; however, due to the variation in size and configuration and the random distribution of the objects, merely counting and summing on a line-by-line scanning basis does not provide an accurate determination of the number of variable size objects in the area since single objects are invariably encountered during successive scan lines and are therefore counted more than once. In order to overcome this problem, apparatus have been proposed to assure that each object is counted at least once but only once, as exemplified by U.S. Pat. Nos. 2,791,377 to Dell et al., 2,803,406 to Nuttall, 2,948,470 to Berkely et al., 2,936,953 to Gerhardt, 2,958,464 to Nassenstein, 3,088,036 to Hobbs and 3,408,485 to Scott et al.; however, these apparatus have been relatively complex and expensive due to the basic approaches of utilizing additional scanning lines and/or delay networks to prevent the counting of an object when an object has been previously encountered at the same relative position on a previous line scan. Attempts to improve the accuracy of these apparatus have resulted only in increasingly costly and complex devices which do not fulfill the existing need for simplified, accurate and rapid apparatus for determining the number of objects in an area.

SUMMARY OF THE INVENTION

Accordingly, it is a primary object of the present invention to accurately determine the number of objects in an assemblage with simplified apparatus.

Another object of the present invention is to provide improved methods and apparatus for more simply and reliably, yet less expensively, determining the number of objects in an assemblage as compared with prior methods and apparatus.

A further basic object of the present invention is to determine the number of objects in an assemblage by scanning with a single beam the assemblage in a non-position-dependent mode of operation without utilizing delay or other timing circuitry to prevent multiple counting of individual objects.

The present invention has another object in the accurate determination of the number of randomly distributed objects regardless of size, size distribution, shape or shape variability by scanning the area line-by-line, comparing the number of objects encountered during each scan line with the number of objects encountered along an adjacent scan line to determine the difference therebetween, and totalling the differences to provide a representation of the number of objects in the area.

Another basic object of the present invention is to determine the number of objects in an assemblage without attempting to count each object at least once by only once.

An additional object of the present invention is to accurately determine the number of objects passing a sensing field by comparing the number of objects detected by the sensing field during successive periods of tiime to determine the difference therebetween, and totalling the differences to provide a representation of the number of objects passing the scan line.

Yet, a further object of the present invention is to automatically compensate for edge overlap in position independent scanning apparatus for determining the number of objects in an assemblage.

Generally, the present invention is based on the concept of comparing the number of objects encountered along adjacent scan lines to determine the difference therebetween and totalling the differences, which total for the entire scan is representative of the number of objects in an assemblage regardless of how many time the same object is encountered along different scan lines. By utilizing only the number of objects encountered along each scan line, the positions along the scan lines of previously encountered objects are immaterial to the end result; and, accordingly, the present invention requires no complex timing or delay circuitry to establish positions along the scan lines.

The present invention is generally characterized in apparatus for determining the number of objects in an assemblage including a scanner device for scanning the assemblage line-by-line; a detector for generating a signal corresponding to the number of objects encountered during each scan line; accumulating means for storing the signal generated during each scan line; a comparator circuit supplying difference signals corresponding to the difference in the number of objects encountered during adjacent scan lines; and translating means for totalling the difference signals to provide a representation of the total number of objects in the assemblage. The present invention is further generally characterized in a method of determining the number of objects in an assemblage including scanning the assemblage line-by-line generating a signal proportional to the number of objects encountered during each scan line; comparing the signal generated for each scan line with a signal corresponding to the number of objects encountered along an adjacent scan line to provide a difference signal corresponding to the difference in the number of objects encountered along adjacent scan lines; and translating the difference signals to represent the number of objects in the assemblage.

Some of the advantages of the present invention over the prior art are that the apparatus of the present invention is simple and inexpensive, that the mode of operation is non-position-dependent along a scan line, that edge overlap compensation is automatically implemented, that the number of logical operations to be performed and the number of complexity of the elements are drastically reduced, and that there is no necessity for careful measurement or regulation of time intervals.

Other objects and advantages of the present invention will become apparent from the following description of the preferred embodiments taken in conjunction with the accompanying drawings.

BRIEF DESCRIPTION OF THE DRAWINGS

FIG. 14 is a block diagram of an additional embodiment of a logic apparatus according to the present invention.

FIG. 15 is a graphic diagram of signals for use with the embodiment of FIG. 14.

FIG. 16 is a block diagram of a further embodiment of a logic apparatus according to the present invention.

FIG. 17 is a graphic diagram of signals for use with the embodiment of FIG. 16.

FIG. 18 is a block diagram of a modification of the scanning apparatus of FIG. 1 along with apparatus for displaying objects encountered during scanning.

DESCRIPTION OF THE PREFERRED EMBODIMENTS

Figure 1:
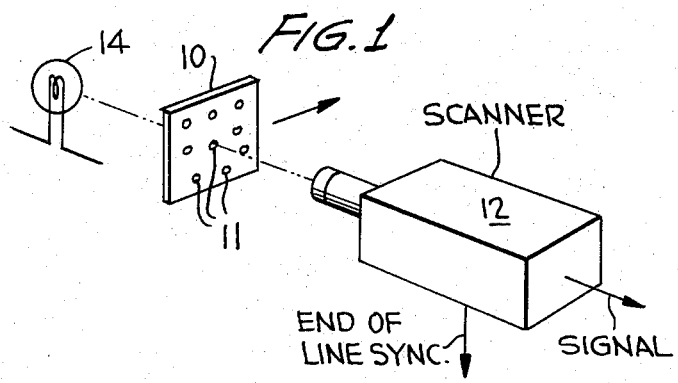
FIG. 1 is a diagrammatic perspective view illustrating the scanning of an area in accordance with the present invention.

Apparatus for scanning an area 10 containing objects 11, the number of which is to be determined, in accordance with the present invention is illustrated in FIG. 1 and includes a scanner device 12 for scanning the area 10, such as a video camera or a flying spot scanner. In the illustrated embodiment, scanner device 12 is a conventional video camera modified to produce a repetitive single line scan over predetermined time periods, and area 10 is moved transversely relative to the scanning line such that an image of the entire area 10 is scanned line-by-line. Area 10 is illuminated on the side opposite scanner device 12 by a light source 14, and objects 11 are either more or less light-transmissive than the background of the area. The area 10 can be maintained stationary, and the scanner device can provide a raster for scanning the area line-by-line, as shown in FIG. 18, in conventional manner. The scan lines need not be linear but can take any repetitive path, and the term "line" as utilized herein is meant to include paths of rectilinear, curvilinear and other configurations. The scan lines can take the form of sensing fields of any suitable field or energy source in order to permit the objects to be sensed magnetically, electrically, thermally, optically, or mechanically, for example. It is important basically only that a repetitive scan line or sensing field be utilized to implement the present invention.

Figure 2:
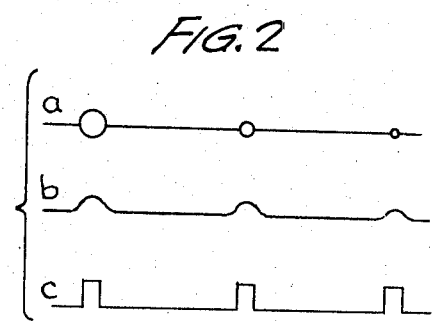
FIG. 2 is a graphic diagram illustrating signals produced in response to objects encountered during a scan line.
Figure 3:
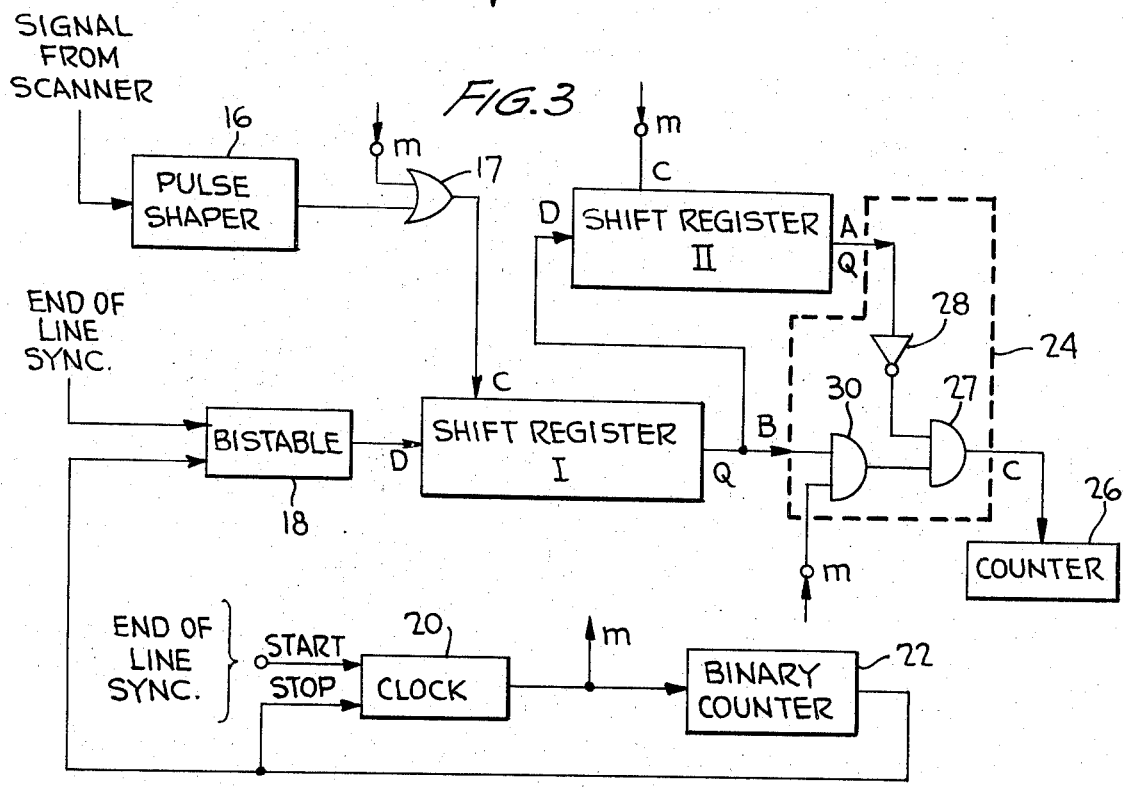
FIG. 3 is a block diagram of logic apparatus according to the present invention.

The pulses provided by the detection of objects encountered during a scan line are illustrated in FIG. 2 wherein line $a$ illustrates three objects or spots of varying size encountered during a scan line; line $b$ illustrates signals produced by an optical detector circuit in scanner device 12 corresponding to the detection of the objects of line $a$; and line $c$ illustrates uniform pulses generated by pulse shaper 16 of FIG. 3 which receives the signals of line $b$ from the scanner device 12. The pulses generated by pulse shaper 16 are independent of the amplitude and width of the signals from the scanner device 12 and are all uniform in triggering characteristics. Pulse shaper 16 may include any conventional circuitry such as a monostable multivibrator or a Schmitt trigger and a timing network to generate a uniform pulse when an input signal exceeds a predetermined threshold. The characteristic of the signals of line $b$ of FIG. 2 which initiates the uniform pulses may be signal height, width, rise time or any desired combination thereof. At the end of each scan line a distinctive end of line signal is generated, such as a sync or blanking pulse obtained from the sweep circuit of the scanner, and serves as a command for logical operations to be performed.

One embodiment of logic apparatus for determing the number of objects 11 in area 10 in accordance with the signals from the scanner device 12 is illustrated in FIG. 3 and includes a shift register designated "Shift Register I" for storing pulses from the pulse shaper 16 which are fed to the clock or shift command input C of the shift register through an OR gate 17. The number of electrically adjacent data positions or stages of the shift register is greater than the largest number of objects to be encountered in a single scan line. It may be assumed that before the accumulation of data, Shift Register I has been reset, as will be set forth hereinafter, so that each stage is in a logical "zero" state. The data input D of the shift register receives the output of a bistable circuit 18, such as a flip flop which, during the accumulation of pulses from the pulse shaper 16, applies a logical "one" to the data input D of the shift register. Each time an object is encountered during a scan line, a pulse is applied to the shift command input C to cause a logical one to be inserted into the first stage of the shift register and cause any data previously accumulated in the shift register to shift one step toward the data output Q. Thus, at the completion of a scan line, the number of ones stored in Shift Register I represents the sum of the objects encountered during the scan line.

At the end of each scan line, an end-of-line signal or sync pulse is supplied to the bistable circuit 18 from scanner device 12 causing bistable circuit 18 to change states and supply a logical "zero" to the data input D of Shift Register I. The same end-of-line sync pulse is supplied to a clock source 20, starting the clock and producing $m$ clock pulses where $m$ corresponds to the number of stages in Shift Register I. The clock pulses are supplied through OR gate 17 to the shift command input C of Shift Register I, reading or shifting out the data stored in the shift register and resetting all stages or positions of the shift register to a zero state. When $m$ pulses have been produced by the clock, a preset counter 22 produces an output which stops the clock, returns the bistable circuit 18 to its one state, and resets itself.

The data shifted out of Shift Register I is supplied to the data input D of a second shift register, Shift Register II, having the same number of stages as Shift Register I, and the clock pulses applied to the shift command input C of Shift Register II cause this data to be entered into Shift Register II. Simultaneously, the data previously stored in Shift Register II corresponding to the number of pulses assembled during the preceding scan line is shifted or read out of Shift Register II at terminal Q thereof for comparison with the output of Shift Register I. The outputs of the shift registers are fed to a comparison circuit 24, the output of which is supplied to a tally counter 26. The output A of Shift Register II is supplied to one input of an AND gate 27 through an inverter 28 while the output B of Shift Register I is supplied to the second input of the AND gate 27 through an AND gate 30 which also receives an input from the clock source. Thus, the assembled pulses in the shift registers are compared synchronously, bit-by-bit, and a pulse is delivered to the tally counter 26 whenever, for any data position, Shift Register I has a one output and Shift Register II has a zero output. It should be noted that the clocking pulses read out the shift register and shift data therebetween at high speeds such that the comparison, data shifting and resetting operations are performed during retrace of the scan line; that is, after completion of a scan line but prior to commencement of the next succeeding scan line. The present invention does not require that the data pulses from one scan line have the same position in the comparison as the data pulses for the same object along an adjacent scan line.

Figure 4:
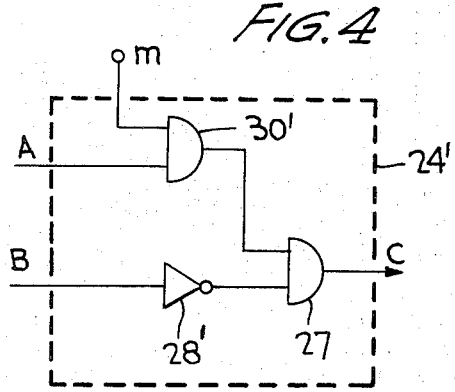
FIGS. 4 and 5 are block diagrams of modified portions of the apparatus of FIG. 3.

In the embodiment of FIG. 3 "positive" differences between the data from successive scan lines are totalized by the tally counter 26; that is, difference signals supplied to tally counter 26 represent only differences when the number of objects encountered along a succeeding scan line is greater than the number of objects encountered along a preceding scan line. "Negative" differences, that is, differences when the number of objects encountered along a succeeding scan is less than the number of objects encountered along a preceding scan line, can also be totallized by tally counter 26 by substituting the comparison circuit 24' of FIG. 4 for the comparison circuit 24. In the modification of FIG. 4, an inverter 28' is inserted between the output B of Shift Register I and AND gate 27, while an AND gate 30' is inserted between the output A of Shift Register II and AND gate 27.

Figure 5:
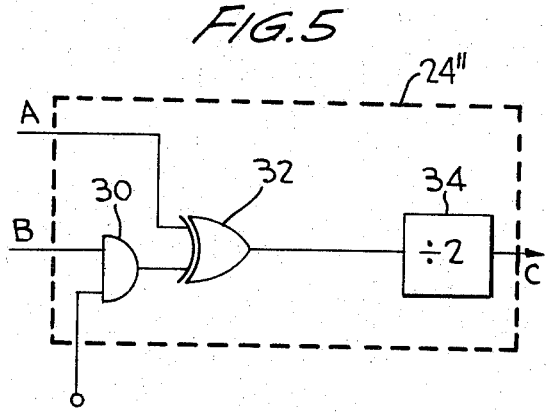

The same results can be obtained, alternatively, by employing the modified comparison circuit 24" of FIG. 5 instead of comparison circuit 24. Comparison circuit 24" produces one-half the absolute difference of the outputs of the shift registers. The output B of Shift Register I is supplied through AND gate 30 to an exclusive-OR gate 32, which also receives the output A of Shift Register II. An output from the exclusive-OR gate is supplied to a divide-by-two circuit 34 whenever the inputs to the exclusive-OR gate are different.

Utilizing the apparatus as shown in FIGS. 3, 4 or 5, the area 10 is scanned line-by-line with the number of objects encountered along each line being represented by pulses stored in Shift Register I. At the end of each scan line, the number of pulses assembled in Shift Register I is compared with the number of objects encountered during the preceding scan, as stored in Shift Register II. The comparison circuit 24 produces signals corresponding to the differences between the number of objects encountered during successive spans, independent of position; and the difference signals are translated by tally counter 26, and in the circuit of FIG. 5 by divider circuit 34, to represent the number of objects 11 in area 10. Accordingly, while the mode of operation is independent of the positions of objects encountered on preceding scans, the same object will not be counted in the total more than once even if encountered during more than one scan line since the difference in number of objects encountered during successive scans is utilized in determining the total number of objects in the area, the differences being totalled in tally counter 26 after the entire area has been scanned.

The tally counter 26 may be connected with any suitable display apparatus to provide a translated output representative of the number of objects in the area 10, such as banks of Nixie tubes, a printout device or the like. As described, the apparatus of FIG. 3 operates to provide an output corresponding to the number of objects in the area after each frame or complete scan of the area; however, due to the great speed capability of the scanning and logic apparatus, the same area may be scanned a number of times with the resulting output at tally counter 26 averaged by dividing the total thereof by the number of frames or with the pulses from the comparator going through a divider prior to application to the counter.

For randomly dispersed objects, a logical random error occurs when the bottom edge of an object is encountered on one scan line and the top edge of another object is encountered on the next successive scan line, such positioning being termed edge overlap. In this case, the new object will not register because there will be no net change in the number of objects encountered on successive scan lines. The fraction of objects missed due to edge overlap is $$\sum_{m=1}^{\infty} \left( \sum_{n=m}^{\infty} P(n; \lambda) \right)^2 \text{ where } P(n; \lambda) = \frac{\lambda^n e^{-\lambda}}{n!}$$

= Poisson distribution and $\lambda$ = total number of objects in the assemblage divided by the total number of scan lines. The first term of the summation, which can be written as $(1-e^{-\lambda})^2$, is a good first approximation to the fraction of objects missed and will vary dependent upon the object density and the number of scan lines independent upon object size or size distribution. By permitting an error of tolerable magnitude, the apparatus of the present invention can be made far simpler than prior apparatus which attempt to ensure the counting of each and every object at least once but only once, and yet, as shown, the error may be reduced without limit merely by increasing the number of scan lines. If desired, charts, nomographs, or other translating means may be employed to correct the number of objects registered to the statistically probable number of objects. If the objects are arrayed systematically, for instance in rows parallel to the scan lines, there will be no logical error.

Figure 6:
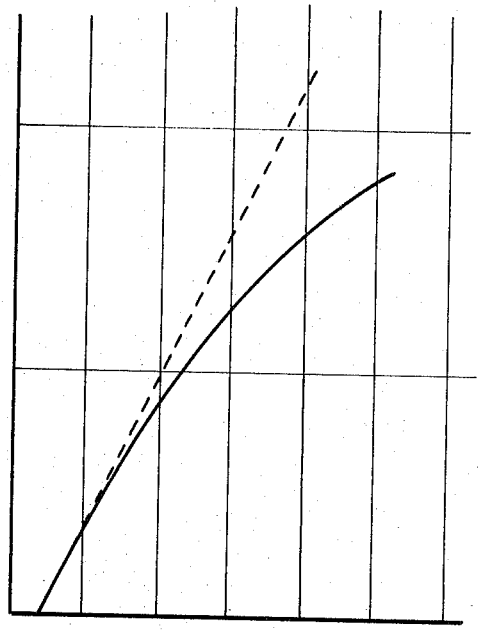
FIG. 6 is a typical graph representing the statistically predictable number of objects having overlapping edges.

The edge overlap is illustrated in FIG. 6 by a plot of the number of objects missed during a scan along the ordinate and the number of objects in the area along the abscissa. The resulting curve, which is dependent on Poisson distribution, as noted from the above summation for determining the number of objects missed due to edge overlap, is not linear as indicated by the solid line; and, accordingly, a linear proportional, compensation as shown by the dashed line, cannot be utilized to accurately compensate for edge overlap.

Figure 7:
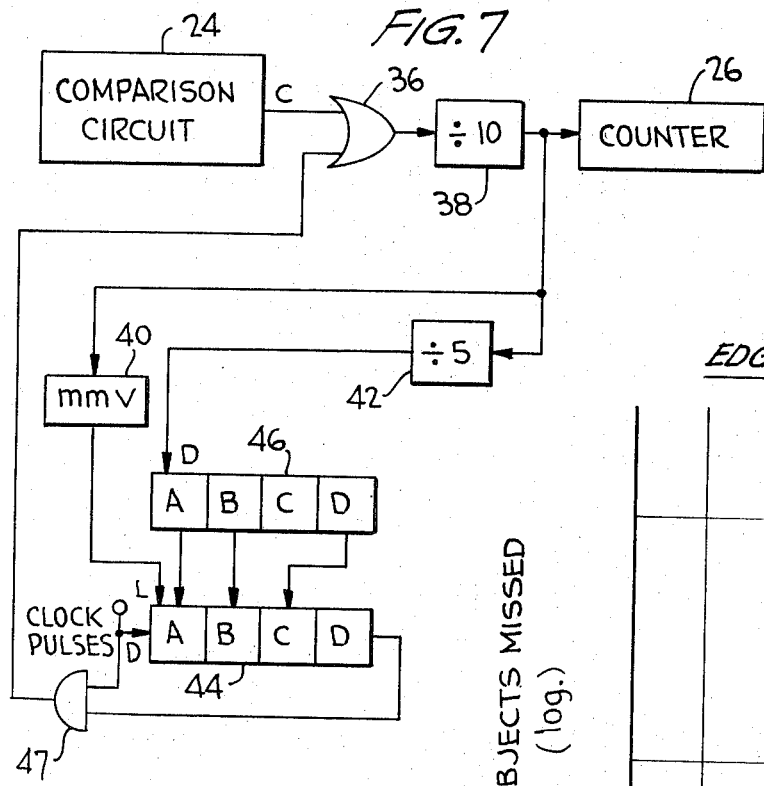
FIG. 7 is a block diagram of an edge overlap compensating circuit for use with the present invention.

An edge overlap compensating circuit for use with the apparatus of FIG. 3 to automatically correct the difference signals supplied on output C from comparison circuit 24 to tally counter 26 is illustrated in FIG. 7 and includes an OR gate 36 receiving signals on output C from the comparison circuit and supplying an output to a divide-by-ten circuit 38, such as a counter. The output from divider 38 is supplied to tally counter 26, a monostable multivibrator 40 and a divide-by-five circuit 42, such as a counter. Monostable multivibrator 40 has an output supplying a signal to the load input L of a shift register 44, and divider 42 supplies an output to a data input D of a shift register 46. Shift register 44 receives clock pulses from clock source 20 of FIG. 3 at data input D, the number of clock pulses received being equal to or greater than the number of stages of the shift register. Each of the shift registers 44 and 46 have a like number of stages, for illustrative purposes only, four stages being shown and designated A, B, C and D. The outputs of stages A, B and D of shift register 46 are connected in parallel with the inputs to stages A, B and C, respectively, of shift register 44, and stage D of shift register 44 has an output supplied through an AND gate 47, which also receives the clock pulses, to OR gate 36.

In operation, monostable multivibrator 40 will trigger shift register 44 to load the stages thereof in parallel fashion from the interconnected stages of shift register 46 after every ten pulses from comparison circuit 24, and a one will be serially loaded into shift register 46 after every 50 pulses from comparison circuit 24. At the end of each scan line, clock source 20 will deliver clock pulses to shift register 44 to read the data out; however, the data in shift register 44 will be zeros until at least 50 difference pulses have been generated on output C of comparison circuit 24. That is, shift register 44 will not be loaded with a one until shift register 46 has received a pulse at its data input D. The data in shift register 46 is loaded in parallel into shift register 44 every ten difference pulses; and, after 50 difference pulses, the one in stage A of shift register 46 will be loaded into shift register 44 every 10 difference pulses such that one compensating pulse will be received at OR gate 36 for every 10 difference pulses after the first 50 difference pulses. In a similar manner, after 100 difference pulses the ones in both stages A and B of shift register 46 will be loaded into shift register 44 such that two compensating pulses will be received at OR gate 36 for every 10 difference pulses after the first 100 difference pulses. After 200 difference pulses, the ones in stages A, B and D of shift register 46 will be loaded into shift register 44 such that three compensating pulses will be received at OR gate 36 for every 10 difference pulses after the first 200 difference pulses.

The edge overlap compensating circuit of FIG. 7, for exemplary purposes, has been shown for use with apparatus for scanning each area 10 times. Accordingly, only one pulse is received by tally counter 26 for each 10 pulses received from comparison circuit 24 and the compensating circuit due to the divide-by-ten averaging function of divider 38. Of course, if desired, the output of OR gate 36 could be supplied directly to tally counter 26 with divider 38 supplying pulses only to the remaining circuitry of the edge overlap correction circuit. Similarly, any divider can be connected in series between the OR gate 36 and tally counter 26 corresponding to the number of scan frames to be averaged.

The parallel connection of the stages of shift registers 44 and 46 permits any desired compensating function to be generated by varying the connection of the outputs of the stages of shift register 46 to the inputs of the stages of shift register 44. In the example set forth above, for illustrative purposes only, no compensating pulses are generated during the first 50 difference pulses, one compensating pulse is generated for each 10 difference pulses between 50 and 100 difference pulses, two compensating pulses are generated for each 10 difference pulses between 100 and 200 difference pulses, and three compensating pulses are generated for each 10 difference pulses over 300 difference pulses. This format can, of course, be changed in accordance with statistically obtained edge overlap compensation curves by varying the connections between shift registers 44 and 46.

Figure 8:
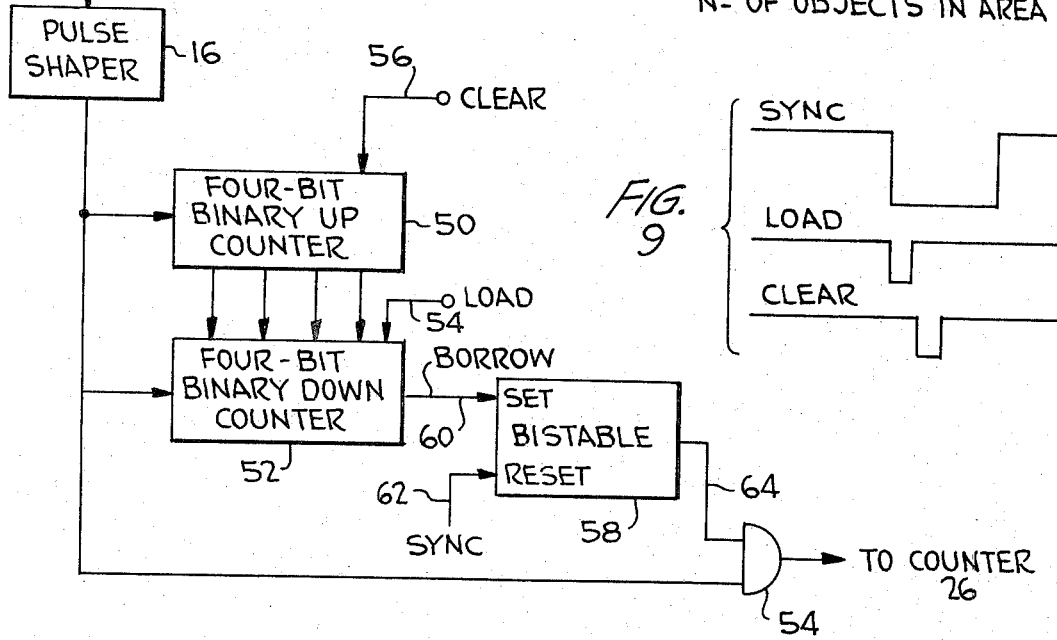
FIG. 8 is a block diagram of another embodiment of logic apparatus according to the present invention.
Figure 9:
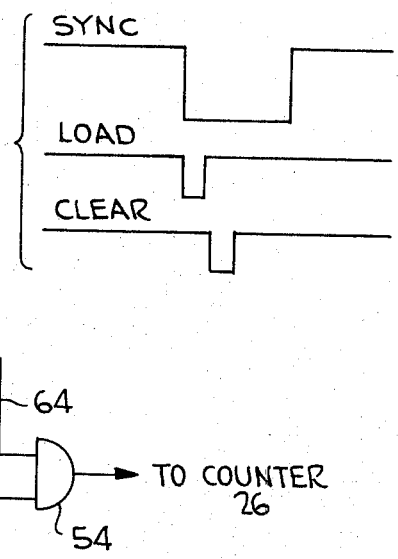
FIG. 9 is a graphic diagram of signals for use with the embodiment of FIG. 8.

Another embodiment of logic apparatus for determining the number of objects in an area by line-by-line scanning is illustrated in FIG. 8 with the signals from scanner device 12 being supplied to pulse shaper 16 to provide uniform pulses, such as those shown in line c of FIG. 2. The pulses from pulse shaper 16 are supplied to a four-bit, binary "up" counter 50 and a four-bit, binary "down" counter 52, as well as to an AND gate 54. The four stages of up counter 50 have their outputs supplied to corresponding stages of down counter 52 such that when a load signal is supplied to input 54, the binary count in up counter 50 will be transferred in parallel fashion to the down counter 52. A clear signal is supplied to input 56 of up counter 50 in order to reset the up counter, and down counter 52 has a borrow output 60 supplied to an input of a bistable latch circuit 58. The bistable circuit 58 also receives end-of-line or sync pulses at an input 62 and has an output 64 supplying a second input to AND gate 54.

In operation, pulses from pulse shaper 16 corresponding to objects encountered during a scan line are supplied concurrently to up counter 50 and down counter 52; and, at the start of a scan line, up counter 50 will have been reset to zero by the clear pulse whereas down counter 52 will store a binary count corresponding to the number of objects encountered during the preceding scan line. Thus, up counter 50 serves to accumulate or total pulses in accordance with the number of objects encountered during a current scan line, and each pulse corresponding to an object encountered is subtracted from the count in down counter 52 to provide a comparison and difference signal generating function. At the beginning of a scan line, bistable circuit 58 will be reset by the sync pulse, as illustrated in FIG. 8, to disable AND gate 54. If the number of objects encountered during the preceding scan line is greater than the number of objects encountered during the current scan line, the bistable circuit 58 will remain reset, and AND gate 54 will not be enabled to pass any pulses. If the number of objects encountered during the preceding scan line is less than the number of objects encountered in the current scan line, down counter 52 will underflow when the number of pulses from pulse shaper 16 equals the number of pulses initially stored in down counter 52 corresponding to the preceding scan line, and this causes a borrow signal to be supplied to the set input of bistable circuit 58 to set the bistable and enable AND gate 54 thereby allowing subsequent pulses from pulse shaper 16, corresponding to the difference in the number of objects encountered during successive scans, to pass through the AND gate 54 and be supplied to tally counter 26 for translating as representative of the number of objects in the area.

Thus, the number determined by counter 26 corresponds to the sum of negative differences of $n_{i+1} - n_i$, where $n$ is the number of objects encountered on the $i^{th}$ scan line. This is equal to the total number of objects in the area scanned less the statistically predictable number of objects in edge overlapping positions, as discussed above with respect to FIGS. 6 and 7. If automatic edge overlap compensation is desired, the output of AND gate 54 may be supplied to the edge overlap compensating circuit of FIG. 7 such that tally counter 26 receives a number of pulses accurately corresponding to the number of objects in the area.

After each scan line is completed, the sync pulse resets bistable circuit 58, the load pulse loads down counter 52 with the binary count in up counter 50 corresponding to the number of objects encountered during the just completed scan line, and thereafter up counter 50 is reset by the clear pulse on input 56. Thus, the area 10 is scanned line-by-line with up counter 50 accumulating a signal proportional to the number of objects encountered during each scan line and transferring such signal to down counter 52 for comparison with a signal corresponding to the number of objects encountered during the next scan line.

Figure 10:
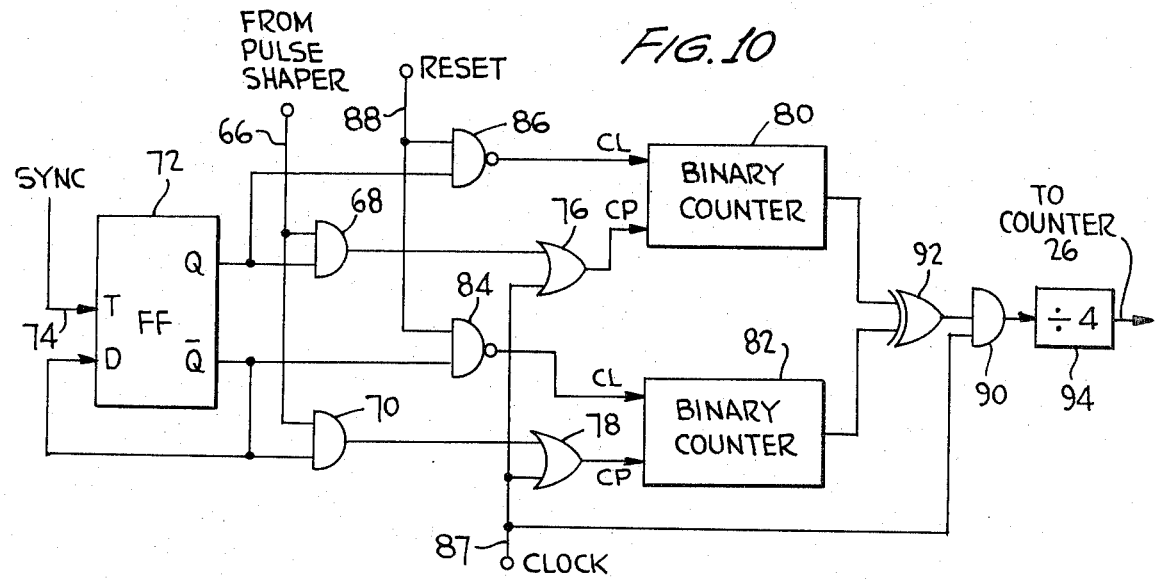
FIG. 10 is a block diagram of a further embodiment of a logic apparatus according to the present invention.

A further embodiment of logic apparatus for determining the number of objects in an area in accordance with the present invention is illustrated in FIG. 10 wherein pulses from pulse shaper 16 are supplied on a lead 66 to AND gates 68 and 70 which have second inputs receiving the outputs Q and Q̄, respectively, from a flip flop 72. The Q̄ output of flip flop 72 is tied back to input D, and an end-of-line or sync pulse from scanner device 12 is supplied to a toggle input 74 of flip flop 72. The outputs of AND gates 68 and 70 are supplied through OR gates 76 and 78 to the clock pulse inputs CP of binary counters 80 and 82, respectively. The Q̄ output of flip flop 72 is supplied to a clear input CL of binary counter 82 through a NAND gate 84; and, similarly, the Q output of flip flop 72 is supplied through a NAND gate 86 to the clear input CL of binary counter 80, NAND gates 84 and 86 having second inputs receiving a reset pulse on a lead 88. Clock pulses are supplied on a lead 87 from a clock source to the clock pulse inputs of binary counters 80 and 82 through OR gates 76 and 78, respectively, and are also supplied to an AND gate 90 which receives a second input from an exclusive-OR gate 92 which, in turn, is supplied with the outputs from binary counters 80 and 82. The output of AND gate 90 is supplied through a divide-by-four circuit 94 and the edge overlap compensating circuit 9f FIG. 6, if desired, to tally counter 26.

Figure 11:
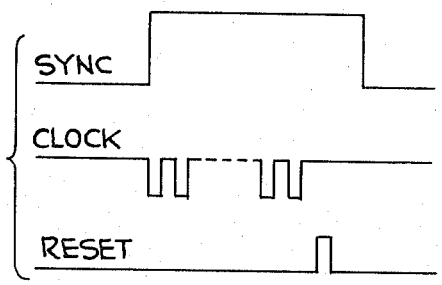
FIG. 11 is a graphic diagram of signals for use with the embodiment of FIG. 10.

In operation, the sync pulse from the scanner device 12 is operative to toggle flip flop 72 to an opposite state after the completion of a scan line such that the Q̄ output flip flop 72 has a one thereat with the Q output of flip flop 72 having a zero thereat whereby AND gate 68 is enabled to pass pulses from pulse shaper 16 on lead 68 to the clock pulse input of binary counter 80 through OR gate 76 and AND gate 70 is inhibited to prevent the passing of pulses on lead 66 to binary counter 82. Thus, during a first scan line, binary counter 80 is operative to accumulate pulses corresponding to the number of objects encountered during that scan line. At the end of the scan line, clock pulses are supplied through OR gates 76 and 78 to both binary counters 80 and 82, the number of clock pulses being equal to the maximum count of the binary counters, in the present example the number of clock pulses being equal to 16. The clock pulses, therefore, read out the counts in binary counters 80 and 82 and return the binary counters to their original states prior to application of the clock pulses. During application of the clock pulses, any difference in the outputs of counters 80 and 82 provides a pulse on the output of exclusive-OR gate 92, which pulses are synchronized at AND gate 90 with the clock pulses and supplied through divider circuit 94 to the edge overlap circuit of FIG. 7, if desired, and to the tally counter 26. After the clock pulses have terminated, a reset pulse is supplied to lead 88, as shown in FIG. 11, and through NAND gate 84 to reset binary counter 82, that is, the binary counter that was not filled during the previous scan line. Thus, after the reset pulse has been supplied to the binary counter 82, binary counter 80 will now have stored therein pulses corresponding to the number of objects encountered during the preceding scan line; and the pulses generated during the next successive scan line will be supplied to binary counter 82 due to the toggling of flip flop 72 on the trailing edge of the sync pulse. NAND gates 84 and 86 assure the steering of the reset pulse only to the binary counter which was not filled during the last scan line.

The clock is started by the leading edge of the sync pulse and includes a counter arranged similar to counter 22 of FIG. 3 to control the number of clock pulses provided to the binary counters and to generate the reset pulse. Exclusive-OR gate 92 passes both positive and negative differences between the number of objects encountered during adjacent scans, and this coupled with the outputs from the binary counters requires that the pulses from exclusive-OR gate 92 be divided by four prior to application to counter 26.

Figure 12:
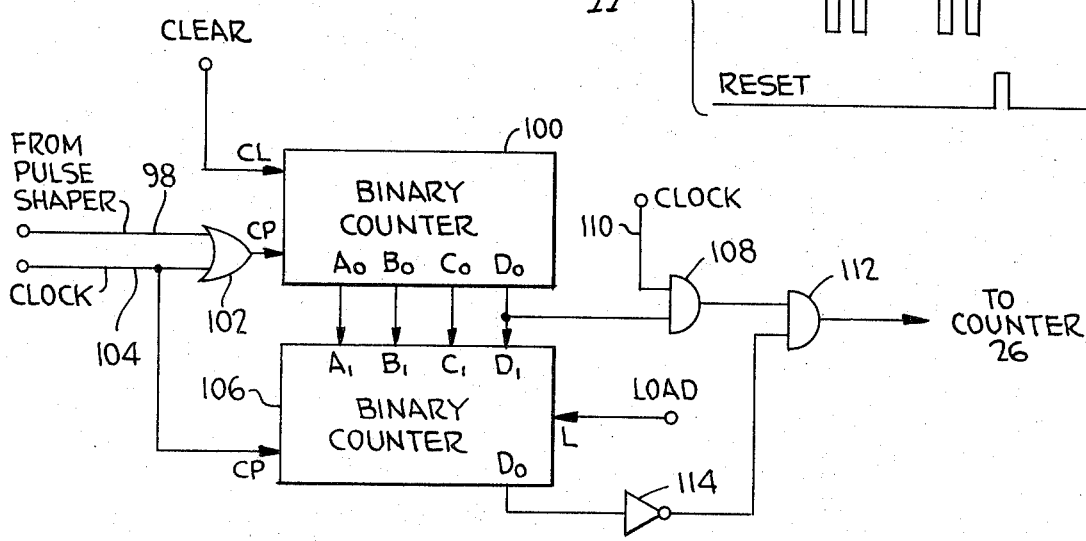
FIG. 12 is a block diagram of another embodiment of logic apparatus according to the present invention.
Figure 13:
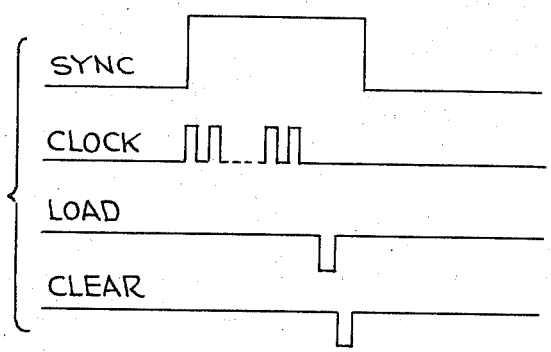
FIG. 13 is a graphic diagram of signals for use with the embodiment of FIG. 12.

Another embodiment of logic apparatus for determining the number of objects in an area is illustrated in FIG. 12, the embodiment of FIG. 12 being analogous to the embodiment of FIG. 3 but utilizing counters rather than shift registers. Pulses from pulse shaper 16 are supplied on a lead 98 to a clock pulse input CP of a binary counter 100 through an OR gate 102 which also receives clock pulses on a lead 104 for supply to the clock pulse input of the binary counter 100. Clear signals are supplied to a clear input CL of binary counter 100, and binary counter 100 has four stages, A, B, C and D, each of which has an output connected with a corresponding stage of a binary counter 106 having a clock pulse input CP receiving clock pulses from lead 104. The $D_o$ output of binary counter 100 supplies an input to an AND gate 108 which also receives clock pulses on a lead 110. The output of AND gate 108 is supplied as an input to an AND gate 112 which receives the output from $D_o$ of binary counter 106 through an inverter 114. The output of AND gate 112 supplies pulses to the edge overlap compensation circuit of FIG. 7, if desired, and to tally counter 26. The pulses assembled in binary counter 100 are loaded in parallel in binary counter 106 by a signal supplied to the load input L of binary counter 106.

In operation, during a scan line, pulses corresponding to objects encountered are supplied on lead 98 to the clock pulse input of binary counter 100 such that binary counter 100 accumulates pulses in accordance with the number of objects encountered during a single scan line. Binary counter 106 at this time has stored therein pulses corresponding to the number of objects encountered during the preceding scan line; and, once the current scan line is completed, the sync pulse initiates action of a clock source similar to that of FIG. 3 to supply a number of clock pulses to binary counters 100 and 106 corresponding to the total count of which they are capable, in the illustrated example 16 clock pulses being generated. The supply of clock pulses drives through the counters 100 and 106 in a manner similar to that described with respect to the embodiment of FIG. 10 with the outputs read out of $D_o$ of counter 100 and $D_o$ of counter 106 supplied to a comparison circuit constructed similar to the comparison circuit 24 of FIG. 3 such that the pulses from AND gate 112 are representative of the differences between the number of objects encountered during successive scan lines. Once the comparison function has been completed, the load signal is supplied to binary counter 106 to load the count of binary counter 100 in counter 106 in parallel fashion; and, thereafter, the clear signal is supplied to the clear input of counter 100 to reset the counter.

An additional embodiment of logic apparatus according to the present invention for determining the number of objects in an area is illustrated in FIG. 14 wherein pulses from pulse shaper 16 are supplied on a lead 116 to a binary counter 118 and to an AND gate 120. Binary counter 118 receives a clear signal at input CL and has four stages, each having an output supplied to a corresponding stage in a storage register 122. The pulse data stored in binary counter 118 is loaded into storage register 112 in response to a load signal at input L of the storage register. The outputs of the stages of the storage register 122 are supplied to one side of a comparator 124, and the outputs of the stages of binary counter 118 are supplied to an opposite side of comparator 124. When the number of pulses stored in binary counter 118 is greater than the number of pulses in the storage register 122, comparator 124 supplies a signal on an output 126 to AND gate 120. Pulses passed by AND gate 120 are supplied to tally counter 26 and, if desired, to the edge overlap compensating circuit of FIG. 7.

In operation, at the beginning of a scan line, binary counter 118 is cleared, and storage register 112 contains an accumulation of pulses corresponding to the number of objects encountered during the preceding scan line. While the current scan line is in progress, pulses corresponding to objects encountered are supplied on lead 116 to binary counter 118 and AND gate 120; and, when the number of pulses received by binary counter 118 on lead 116 equals the number of pulses stored in storage register 122, such that the output of binary counter 118 is greater than or equal to the output of storage register 122, comparator 124 provided a one on output 126 to enable AND gate 120 and pass further pulses from pulse shaper 16 during the scan line such that $n_{i+1} - n_i$ ($>0$) pulses are added to the tally at counter 26. At the end of the scan line, a load pulse is supplied to storage register 122 to load the storage register with the data from binary counter 118 in a parallel fashion; and, after loading, a clear signal is supplied to binary counter 118 to reset the counter in preparation for the next scan line.

Yet, a further embodiment of logic apparatus in accordance with the present invention for determining the number of objects in an area is illustrated in FIG. 16 wherein pulses from pulse shaper 16 are delivered on a lead 128 for supply through an OR gate 130 to a clock input CP of a binary counter 132 and direct supply to a clock input CP of a binary counter 134. Binary counter 134 has four stages, each of which has its output connected to a corresponding stage of a binary counter 136 which receives clock pulses on a lead 137 from a clock source similar to that of FIG. 3 at a clock input CP, which clock pulses are also supplied to the clock input of binary counter 132 through OR gate 130. A load signal is supplied to input L of binary counter 136 in order to effect parallel loading of the data in counter 134 into counter 136. The Q outputs of counters 132 and 136 are supplied to toggle inputs T of JK flip flops 138 and 140, respectively. A clear pulse is delivered to a lead 142 for supply to the clear inputs CL of counters 132 and 134 and the reset inputs R of flip flops 138 and 140. The $\bar{Q}$ output of flip flop 138 is supplied to an AND gate 144 which also receives the Q output of flip flop 140 and clock pulses from lead 137. The output of AND gate 144 is supplied to counter 26 and, if desired, to the edge overlap compensating circuit of FIG. 7.

In operation, at the beginning of a scan line, counters 132 and 134 and flip flops 138 and 140 are reset while binary counter 136 contains an accumulation of pulses corresponding to the number of objects encountered during the preceding scan line. While the current scan line is in progress, pulses from pulse shaper 16 are supplied to binary counters 132 and 134. The function of binary counter 134 is primarily only to store pulses corresponding to objects encountered during the current scan line such that the stored pulses in binary counter 134 may be loaded in parallel fashion into binary counter 136 by a signal on load input L. At the end of the scan line, the clock source is initiated by the sync pulse to supply clock pulses through OR gate 130 to binary counter 132 and to binary counter 136 to read out the pulses therein corresponding to the number of objects encountered during successive scan lines, the output pulses from counters 132 and 136 toggling flip flops 138 and 140, respectively, once $16 - n_i$ clock pulses have been received at binary counter 132, which is used for comparison purposes, and $16 - n_{i-1}$ clock pulses have been received by binary counter 136. With the flip flops toggled, AND gate 144 will pass $n_i - n_{i-1}$ (>0) pulses to be supplied to counter 26. If AND gate 144 were fed with the Q output of flip flop 138 and the $\bar{Q}$ output 140, the pulses passed by AND gate 144 would be $n_i - n_{i-1}$ (<0).

A display device for use with any of the above embodiments is shown in FIG. 18 and includes a cathode ray tube (CRT) 148 for visually displaying the area being scanned and the objects carried thereon. A videocamera 150 for scanning area 10 line-by-line with a raster such that area 10 remains stationary can also be utilized with any of the above embodiments and supplied horizontal sync or end-of-end line signals to CRT 148 on a lead 152 and vertical stop and start signals to CRT 148 on a lead 154. A video signal is supplied on a lead 156 to CRT 148 and to pulse shaper 16 to generate uniform clipped and shaped pulses for the logic of the embodiments of FIGS. 3,4, 5, 8, 10,12,14 and 16, the horizontal sync signal also being supplied to such logic, as previously described. The pulses from pulse shaper 16 are also supplied to CRT 148 on a lead 158, and suitable circuitry is included within CRT 148 to either receive one or the other of the signals on leads 156 or 158, such as a single pole, double throw switch, or to receive the signals on leads 156 and 158 simultaneously to provide a display of the entire area 10 with objects encountered being brighter than the background, such as a mixer or a mixer with a delay such that the bright displays are displaced from the objects.

Objects of different shapes can be counted by the use of coherent optical correlation (spatial) filters. In this procedure objects with a selected shape are projected on an image (scanning) plane as spots of light, while no light is projected from objects of other shapes. Thus, the spatially filtered image may be scanned once for each shape to be counted, and the number of objects of each shape summed independently. The principles of such coherent optical correlation techniques are well known. See for example A. VanderLugt, *IEEE Transactions on Information Theory I.T.*-10 139 (1964). Examples of possible applications of shape discrimination in conjunction with the present invention are in discriminating between bacteriophage plaques which may appear as solid discs or annular rings or in counting selected objects in aerial photographs.

Coherent optical techniques may also be employed for size discrimination. Electronic discrimination of the scanning signal by pulse width or pulse height is also possible for this purpose.

Objects of different color in the same field may be counted independently on different scans by the use of appropriate color filters in the optical path or simultaneously with a color television camera. Optical density discrimination may be obtained by employing well known pulse height discrimination techniques to count objects of differing density on successive scans. Alternatively, multiple circuits of the types shown in any of FIGS. 3, 4, 5, 8, 10, 12, 14 or 16 may be employed simultaneously, each utilizing a different pulse height threshold. Multiple circuits may also be employed for discimination of any other parameter of interest.

The present invention may be utilized for a wide variety of applications in addition to the aforementioned biomedical applications, for example, determining the number of holes in punched cards, determining the number of marked answer blocks on multiple-choice anser sheets, and determining the number of randomly dispersed objects on a conveyor belt or in a flowing gas or liquid to name a few.

The term "scanning" as utilized in the present invention refers to the scanning on a line-by-line basis of an area or assemblage of objects, the setting up of a single scan line and the moving of an area or an assemblage of objects past the scan line or the flow of objects continuously past a scan line, the latter scan line being formed as a sensing field. That is, the present invention may be utilized for any application where a number of objects in an assemblage is to be determined either by scanning the assemblage or by movement of the assemblage past a scan line or sensing field established for predetermined periods of time.

The logic apparatus of the present invention as illustrated in the embodiments of FIGS. 3, 4, 5, 8, 10, 12, 14, and 16 is not limiting in that any logic apparatus providing means for storing a signal corresponding to a number of objects encountered in a scan line and means for comparing the stored signal with a signal generated during an adjacent scan line may be utilized to implement the present invention. To this end, it is noted that in the embodiments of FIGS. 8 and 14, the comparison is accomplished during a scan line whereas in the remaining embodiments, the comparison is accomplished after completion of a scan line. If desired, a signal corresponding to the number of objects encountered during each scan line may be stored until the entire scan frame is completed and thereafter signals stored corresponding to adjacent scan lines are compared. While the illustrative embodiments of the present invention shown in the drawings and described above have been described only to digital implementation of the present invention, the method and apparatus of the present invention can be implemented on an analog basis utilizing energy storage devices, such as capacitors, to store an analog signal proportional to the number of objects encountered during successive scan lines and the analog signals may then be compared to provide difference signals. Accordingly, the phase "generating a signal corresponding to the number of objects encountered during each scan line" and similar language utilized in the specification and claims is meant to include pulses representing the number of objects encountered for digital operations and linear signals proportional to the number of objects encountered for analog operations. Moreover, if it is desired to perform the logical comparison operations in a length of time greater than the time between successive scan lines, a further storage device or accumulator may be employed to accumulate data from the current scan line during the comparison operation.

Inasmuch as the present invention is subject to many variations, modifications and changes in detail, it is intended that all matter described above or shown in the accompanying drawings be interpreted as illustrative and not in a limiting sense.

What is claimed is:

1. Apparatus for determining the number of objects in an assemblage comprising
means for scanning the assemblage line-by-line;
detector means for generating pulses corresponding to the number of objects encountered during each scan line;
accumulating means for storing said pulses generated during each scan line;

comparison means connected with said accumulating means and supplying difference signals corresponding to the difference in number of objects encountered during adjacent scan lines; and translating means receiving and totalling said difference signals and providing an output representative of the total number of objects in the assemblage, said translating means including tally counter means receiving said difference signals from said comparison means and edge overlap compensating means for compensating for overlapping edges of objects in the assemblage during a scan line, said edge overlap compensating means receiving said difference signals from said comparison means and supplying compensating signals to said tally counter means in response to the value of said difference signals.

2. The apparatus as recited in claim 1, wherein said detector means includes means for generating a pulse for each object encountered during each scan line, and said accumulating means includes means for storing said pulses.

3. The apparatus as recited in claim 2 wherein said accumulating means includes first counter means receiving the pulses generated by said detector means during a scan line in progress and second counter means storing pulses generated during the preceding scan line.

4. The apparatus as recited in claim 3 wherein said first and second counter means each have an output connected with said comparison means, and said comparison means includes readout means for supplying the pulses stored in said first and second counter means to said comparison means.

5. The apparatus as recited in claim 4 wherein said scanning means generates an end-of-line pulse at the completion of each scan line, and said readout means includes a clock source responsive to said end-of-line pulse to supply clock pulses to said first and second counter means.

6. The apparatus as recited in claim 5 wherein said first counter means has a plurality of stages and said second counter means has a like plurality of stages, said stages of said first counter means connected with corresponding stages of said second counter means, and further comprising control means responsive to said end-of-line signal to load the pulses stored in said first counter means into said second counter means and to clear said first counter means.

7. The apparatus as recited in claim 2 wherein said accumulating means includes first storage means receiving pulses generated by said detecting means during a scan line in progress and second storage means storing pulses corresponding to the number of objects encountered during a scan line preceding the scan line in progress, said first and second storage means having outputs supplied to said comparison means, said comparison means including gating means receiving pulses generated by said detecting means during the scan in progress, said gating means being enabled to pass said pulses where the output of said first storage means exceeds the output of said second storage means.

8. The apparatus as recited in claim 7 wherein said first storage means includes a plurality of stages, said second storage means includes a like plurality of stages, each of said stages of said first storage means being connected with a corresponding stage of said second storage means, and said scanning means generates an end-of-line pulse at the completion of each scan line, and further comprising control means responsive to said end-of-line pulse to load the pulses stored in said first storage means into said second storage means and to clear said first storage means.

9. The apparatus as recited in claim 2 wherein said accumulating means includes first storage means receiving pulses generated by said detecting means during a scan line and having an output supplied to said comparison means and second storage means storing pulses corresponding to the number of objects encountered during a preceding scan line and having an output supplied to said comparison means and said scanning means generates an end-of-line pulse at the completion of each scan line, and further comprising control means responsive to said end-of-line pulse to read out the pulses stored in said first and second storage means at said outputs for supply to said comparison means.

10. The apparatus as recited in claim 9 wherein said second storage means has an input receiving said output of said first storage means whereby said second storage means is loaded with pulses corresponding to the number of objects encountered during the last scan line.

11. The apparatus as recited in claim 10 wherein said control means includes a source of clock pulses supplied to said first and second storage means in response to said end-of-line pulse.

12. The apparatus as recited in claim 11 wherein said first and second storage means are each shift registers.

13. The apparatus as recited in claim 1 wherein said translating means includes tally counter means for totalling said difference signals.

14. The apparatus as recited in claim 1 wherein said comparision means provides difference signals only when the number of objects encountered during a succeeding scan line is greater than the number of objects encountered during a preceding scan line.

15. The apparatus as recited in claim 1 wherein said comparison means provides difference signals only when the number of objects encountered during a succeeding scan line is less than the number of objects encountered during a preceding scan line.

16. The apparatus as recited in claim 1 wherein said comparison means provides absolute difference signals when the number of objects encountered during a succeeding scan line is greater than and less than the number of objects encountered during a preceding scan line, and said translating means includes divider means to divide said difference signals by two.

17. The apparatus as recited in claim 1 wherein said difference signals are pulses, said edge overlap compensation means including first shift register means receiving a data pulse for every first predetermined number of pulse difference signals and having a plurality of stages, second shift register means receiving a load pulse for every second predetermined number of pulse difference signals and having a plurality of stages and an output for supplying compensating pulses to said tally counter means, said stages of said first shift register means being connected with said stages of said second shift register means to load said second shift register means from the data pulses in said first first shift register means responsive to each load pulse supplied to said second shift register means, and means for reading out the pulses loaded into said second shift register means to supply compensating pulses on said output to said tally counter means.

18. The apparatus as recited in claim 17 wherein said read out means includes a clock source supplying clock pulses to said second shift register means, and wherein said just predetermined number of pulses is greater than said second predetermined number of pulses.

19. Apparatus for determining the number of objects in an assemblage comprising means for scanning the assemblage line-by-line;

detector means for generating pulses corresponding to the number of objects encountered during each scan line;

accumulating means for storing said pulses generated during each scan line, said accumulating means including first counter means receiving the pulses generated by said detector means during a scan line in progress and second counter means storing pulses generated during the preceding scan line;

comparison means connected with said accumulating means and supplying difference signals corresponding to the difference in the number of objects encountered during adjacent scan lines; and translating means receiving and totalling said difference signals and providing an output representative of the total number of objects in the assemblage.

said comparison means including means supplying said pulses generated during a scan line in progress to said second counter means, said first counter means accumulating pulses generated during the scan line in progress and said second counter means substracting pulses generated during the scan line in progress from the pulses stored therein, said second counter means having an output supplying a signal to said translating means when the number of pulses received during a scan in progress is greater than the number of pulses from the preceding scan line stored in said second counter means.

20. The apparatus as recited in claim 19 wherein said translating means includes gating means receiving said output signal from said second counter means and said pulses generated by said detector means during a scan line in progress, said gating means being enabled by said output signal from said second counter means to pass said pulses generated during a scan line in progress, and tally counter means receiving pulses from said gating means.

21. The apparatus as recited in claim 20 wherein said scanning means generates an end-of-line pulse at the completion of each scan line, and further comprising control means responsive to said end-of-line pulse to load the pulses accumulated in said first counter means into said second counter means and to clear said first counter means.

22. Apparatus for determining the number of objects in an assemblage comprising means for scanning the assemblage line-by-line detector means for generating pulses corresponding to the number of objects encountered during each scan line;

accumulating means for storing said pulses generated during each scan line, said accumulating means including first counter means receiving the pulses generated by said detector means during a scan line in progress and second counter means storing pulses generated during the preceding scan line, said first and second counter means each having an output connected with said comparison means;

comparison means connected with said accumulating means and supplying difference signals corresponding to the difference in the number of objects encountered during adjacent scan lines, said comparison means including readout means for supplying the pulses stored in said first and second counter means to said comparison means, said readout means including a clock source responsive to said end-of-line pulse to supply clock pulses to said first and second counter means;

said scanning means generating an end-of-line pulse at the completion of each scan line, said first counter means having a plurality of stages and said second counter means having a like plurality of stages, said stages of said first counter means connected with corresponding stages of said second counter means; and translating means receiving and totalling said difference signals and providing an output representative of the total number of objects in the assemblage, said first counter means including a compare counter providing said output and a store counter, the stages of said store counter being connected with said stages of said second counter means, and said comparison means including bistable means receiving said output from said compare counter and said output from said second counter means, said bistable means being responsive to the counts of said compare counter and said second counter means read out by said clock pulses to generate pulses corresponding to the difference between said counts.

23. The apparatus as recited in claim 22 wherein said bistable means includes a first bistable circuit having a toggle input receiving the output from said compare counter and a second bistable circuit having a toggle input receiving the output from said second counter means, and said comparison means includes gating means receiving outputs from said first and second bistable circuits and said clock pulses, said gating means being enabled to pass said clock pulses after one of said first or second bistable circuits has changed states in response to the clock pulse readout of said compare counter and said second counter means.

24. Apparatus for determining the number of objects in an assemblage comprising means for scanning the assemblage line-by-line;

detector means for generating pulses corresponding to the number of objects encountered during each scan line;

accumulating means for storing said pulses generated during each scan line;

comparison means connected with said accumulating means and supplying difference signals corresponding to the difference in the number of objects encountered during adjacent scan lines; and translating means receiving and totalling said difference signals and providing an output representative of the total number of objects in the assemblage, said accumulating means includes first counter means and second counter means, and control means for supplying pulses generated by said detector means during a first scan line to said first counter means and supplying pulses generated by said detector means during a second scan line following said first scan line to said second counter means, and said comparison means includes means for reading out the pulses stored in said first and second counter means at the end of each scan line, said first counter means storing pulses corresponding to the number of objects encountered during said first scan line and said second counter means storing pulses corresponding to the number of objects encountered during a scan line preceding said first scan line at the end of said first scan line, and said second counter means storing pulses corresponding to the number of objects encountered during said second scan line and said first counter means storing pulses corresponding to the number of objects encountered during said first line scan at the end of said second scan line.

25. The apparatus as recited in claim 24 wherein said scanning means generates an end-of-line pulse at the end of each scan line, and said control means includes a bistable circuit having a toggle input receiving said end-of-line pulse and first and second complementary outputs, and first and second gating means receiving said first and second complementary bistable circuit outputs, respectively, and each receiving pulses from said detecting means, said first and second gating means having outputs supplied to said first and second counters, respectively, and being alternately enabled with toggling of said bistable circuit.

26. The apparatus as recited in claim 25 wherein said read out means includes a source of clock pulses responsive to said end-of-line pulse, and said comparison means includes third and fourth gating means receiving said clock pulses and said first and second complementary bistable circuit outputs, respectively, said third and fourth gating means having outputs supplied to said first and second counters, respectively, sand being alternately enabled with toggling of said bistable circuit, said first and fourth gating means being simultaneously enabled and said second and third gating means being simultaneously enabled.

27. Apparatus for determining the number of objects in an assemblage comprising means for scanning the assemblage line-by-line;

detector means for generating pulses corresponding to the number of objects encountered during each scan line;

accumulating means for storing said pulses generated during each scan line, said accumulating means including first storage means receiving pulses generated by said detecting means during a scan line in progress and second storage means storing pulses corresponding to the number of objects encountered during a scan line preceding the scan line in progress, said first and second storage means having outputs supplied to said comparison means;

comparison means connected with said accumulating means and supplying difference signals corresponding to the difference in the number of objects encountered during adjacent scan lines, said comparison means including gating means receiving pulses generated by said detecting means during the scan in progress, said gating means being enabled to pass said pulses where the output of said first storage means exceeds the output of said second storage means;

translating means receiving and totalling said difference signals and providing an output representative of the total number of objects in the assemblage, said first storage means being a binary counter and including a plurality of stages, said second storage means being a storage register and including a plurality of stages, each of said stages of said first storage means being connected with a corresponding stage of said second storage means, and said scanning means generating an end-of-line pulse at the completion of each scan line; and control means responsive to said end-of-line pulse to load the pulses stored in said first storage means into said second storage means and to clear said first storage means.

* * * * *